(12) United States Patent
Shi et al.

(10) Patent No.: US 10,440,754 B2
(45) Date of Patent: Oct. 8, 2019

(54) RANDOM ACCESS METHOD AND APPARATUS FOR SUPPORTING MULTIPLE TRANSMISSION TIME INTERVALS AND COMMUNICATIONS SYSTEM

(71) Applicant: FUJITSU LIMITED, Kawasaki-shi, Kanagawa (JP)

(72) Inventors: Yulong Shi, Beijing (CN); Haibo Xu, Beijing (CN); Hua Zhou, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/892,779

(22) Filed: Feb. 9, 2018

(65) Prior Publication Data

US 2018/0167980 A1 Jun. 14, 2018

Related U.S. Application Data

(63) Continuation of application No. PCT/CN2015/087502, filed on Aug. 19, 2015.

(51) Int. Cl.
*H04W 72/04* (2009.01)
*H04W 74/08* (2009.01)
(Continued)

(52) U.S. Cl.
CPC .......... *H04W 74/0833* (2013.01); *H04L 1/00* (2013.01); *H04W 72/02* (2013.01);
(Continued)

(58) Field of Classification Search
CPC ..... H04W 74/08; H04W 72/04; H04W 74/00; H04W 72/02; H04W 72/048; H04W 74/004

See application file for complete search history.

(56) References Cited

U.S. PATENT DOCUMENTS

2009/0262681 A1* 10/2009 Park ................ H04W 74/0841
370/328
2012/0002606 A1* 1/2012 Vujcic ............... H04W 36/385
370/328
(Continued)

FOREIGN PATENT DOCUMENTS

CN 102387600 A 3/2012
CN 102811496 A 12/2012
(Continued)

OTHER PUBLICATIONS

Notification of Reasons for Refusal issued by the Japan Patent Office for corresponding Japanese Patent Application No. 2018-508217, dated Jan. 8, 2019, with an English translation.
(Continued)

*Primary Examiner* — Chi Ho A Lee
(74) *Attorney, Agent, or Firm* — Myers Wolin, LLC

(57) ABSTRACT

A random access method and apparatus for supporting multiple TTIs and a communications system. The random access method includes: transmitting a preamble for requesting random access by a UE to a base station via a first message; a TTI type of the UE is indicated by the first message; and receiving by the UE a random access response transmitted by the base station via a second message; different TTI types correspond to different random access responses. Hence, latency of a random access procedure of a UE having a short TTI may be greatly lowered.

18 Claims, 7 Drawing Sheets

(51) Int. Cl.
  *H04L 1/00* (2006.01)
  *H04W 72/02* (2009.01)
  *H04W 74/00* (2009.01)

(52) U.S. Cl.
  CPC ...... *H04W 72/048* (2013.01); *H04W 72/0446* (2013.01); *H04W 72/0453* (2013.01); *H04W 74/004* (2013.01)

(56) References Cited

U.S. PATENT DOCUMENTS

| | | | |
|---|---|---|---|
| 2013/0208668 A1* | 8/2013 | Ramos | H04W 76/36 370/329 |
| 2014/0050157 A1* | 2/2014 | Korhonen | H04W 74/006 370/329 |
| 2014/0269451 A1* | 9/2014 | Papasakellariou | H04B 7/2656 370/280 |
| 2014/0334448 A1* | 11/2014 | Langereis | H04W 36/0072 370/331 |
| 2015/0341950 A1* | 11/2015 | Pang | H04W 72/1263 370/329 |
| 2016/0241615 A1* | 8/2016 | Chen | H04L 41/5009 |
| 2016/0270038 A1* | 9/2016 | Papasakellariou | H04W 72/042 |
| 2016/0315726 A1* | 10/2016 | Sandberg | H04W 72/121 |
| 2016/0330766 A1 | 11/2016 | Liu et al. | |
| 2017/0048727 A1* | 2/2017 | Cho | H04L 1/0018 |
| 2017/0164363 A1 | 6/2017 | Zhang et al. | |
| 2018/0206271 A1* | 7/2018 | Chatterjee | H04L 5/0053 |
| 2018/0288683 A1* | 10/2018 | Bendlin | H04W 48/14 |

FOREIGN PATENT DOCUMENTS

| | | |
|---|---|---|
| CN | 102891741 A | 1/2013 |
| CN | 103326804 A | 9/2013 |
| CN | 104468030 A | 3/2015 |
| CN | 104780617 A | 7/2015 |
| EP | 2 680 651 A1 | 1/2014 |
| EP | 2 770 790 A1 | 8/2014 |

OTHER PUBLICATIONS

Qualcomm Incorporated, "Open Issues on concurrent deployment of 2ms and 10ms TTI in a cell in CELL_FACH", Agenda Item: 10.1.3, 3GPP TSG-RAN WG2 Meeting #77, R2-120588, Dresden, Germany, Feb. 6-10, 2012.
3GPP TS 36.300 V11.7.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Sep. 2013, pp. 73-74.
ETRI, "Consideration on Random Access for Heterogeneous TTIs in a Carrier", Agenda Item: 7.11, 3GPP TSG-RAN WG2 Meeting #91, R2-153548, Beijing, China, Aug. 24-28, 2015.
International Search Report issued for corresponding International Patent Application No. PCT/CN2015/087502, dated May 20, 2016, with an English translation.
Written Opinion of the International Searching Authority issued for corresponding International Patent Application No. PCT/CN2015/087502, dated May 20, 2016, with an English translation.
Extended European search report with supplementary European search report and the European search opinion with annex issued by the European Patent Office for corresponding European Patent Application No. 15901477.8-1215, dated Feb. 18, 2019.
Fujitsu, Change Request for : "Miscellaneous corrections to MAC specification", 3GPP TSG-RAN WG2 Meeting #65bis, R2-092420, Seoul, Korea, Mar. 23-27, 2009.
Notice of Preliminary Rejection issued by the Korean Intellectual Property Office for corresponding Korean Patent Application No. 10-2018-7006151, dated Mar. 8, 2019, with an English translation.

\* cited by examiner

RANDOM ACCESS METHOD AND APPARATUS FOR SUPPORTING MULTIPLE TRANSMISSION TIME INTERVALS AND COMMUNICATIONS SYSTEM

CROSS REFERENCE TO RELATED APPLICATIONS

This application is a continuation application of International Application PCT/CN2015/087502 filed on Aug. 19, 2015, the entire contents of which are incorporated herein by reference.

TECHNICAL FIELD

This disclosure relates to the field of communications technologies, and in particular to a random access method and apparatus for supporting multiple transmission time intervals (TTIs) and a communications system in a long-term evolution (LTE) system.

BACKGROUND

Real-time traffics, such as automatic driving and industrial automatic control, etc., that will be carried out in a next-generation mobile communications network, have a very high requirement on transmission latency, such as requiring that peer-to-peer latency is between 1 ms and 10 ms. When such traffics are carried by an LTE system, a relatively large challenge will be brought about to latency performance of the network. And furthermore, for a legacy transmission control protocol (TCP) traffic, reduction of peer-to-peer latency may greatly improve throughput of the system. Considering from the two aspects, it is urgently needed to lower the peer-to-peer latency of the traffics in the LTE system.

3GPP (3rd-generation partnership project) has been working on the reduction of peer-to-peer latency by shortening a TTI. A legacy user equipment (UE) adopts 1 ms as the TTI with the same value of a subframe, that is, a basic time unit of scheduling data is 1 ms. If a shortened TTI is supported in a UE in the latest release, such as a TTI of 0.5 ms or shorter, peer-to-peer latency of a traffic will be outstandingly lowered. A round trip time (RTT) in a legacy system is 8 TTIs. And after the TTIs are shortened, the RTT will become from original 8 ms to 4 ms, or even shorter.

Hence, a legacy UE (for example, the UE adopts 1 ms as the TTI) and a shorter TTI UE (for example, the UE adopts a TTI shorter than 1 ms) will exist in an LTE cell. And backward compatibility needs to be kept in the design of an LTE system, so as to ensure that the legacy UE and the shorter TTI UE operate at the same time while not interfering with each other.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventor that if multiple TTI types of UEs perform random access according to existing protocols, a base station is unable to differentiate a TTI type of UE by which a preamble is transmitted, and as the UE is unable to differentiate a received random access response (RAR), an ambiguity or an error may be resulted in receiving the RAR.

Embodiments of this disclosure provide a random access method and apparatus for supporting multiple TTIs and a communications system, in which a message of the shorter TTI UE in a random access procedure is permitted to be transmitted by using a short TTI which is shorter than a TTI of the legacy UE.

According to a first aspect of the embodiments of this disclosure, there is provided a random access method for supporting multiple TTIs, applicable to a UE, the random access method including:

transmitting to a base station a preamble for requesting random access by the UE via a first message; a TTI type of the UE is indicated by the first message; and receiving by the UE a random access response transmitted by the base station via a second message; different TTI types correspond to different random access responses.

According to a second aspect of the embodiments of this disclosure, there is provided a random access apparatus for supporting multiple TTIs, configured in a UE, the random access apparatus including:

a random request transmitting unit configured to transmit to a base station a preamble for requesting random access via a first message; a TTI type of the UE is indicated by the first message; and a random response receiving unit configured to receive a random access response transmitted by the base station via a second message; different TTI types correspond to different random access responses.

According to a third aspect of the embodiments of this disclosure, there is provided a random access method for supporting multiple TTIs, applicable to a base station, the random access method including:

receiving by the base station a preamble for requesting random access transmitted by a UE via a first message; a TTI type of the UE is indicated by the first message; and transmitting a random access response by the base station to the UE via a second message; different TTI types correspond to different random access responses.

According to a fourth aspect of the embodiments of this disclosure, there is provided a random access apparatus for supporting multiple TTIs, configured in a base station, the random access apparatus including:

a random request receiving unit configured to receive a preamble for requesting random access transmitted by a UE via a first message; a TTI type of the UE is indicated by the first message; and a random response transmitting unit configured to transmit a random access response to the UE via a second message; different TTI types correspond to different random access responses.

According to a fifth aspect of the embodiments of this disclosure, there is provided a communications system, supporting multiple TTIs, the communications system including:

a UE configured to transmit a preamble for requesting random access via a first message, a TTI type of the UE being indicated by the first message, and receive a random access response transmitted via a second message; and a base station configured to receive the preamble transmitted by the UE via the first message, and transmit the random access response to the UE via the second message; different TTI types correspond to different random access responses.

According to another aspect of the embodiments of this disclosure, there is provided a computer readable program code, which, when executed in a UE, will cause a computer unit to carry out the random access method as described above in the UE.

According to a further aspect of the embodiments of this disclosure, there is provided a computer storage medium, including a computer readable program code, which will cause a computer unit to carry out the random access method as described above in a UE.

According to still another aspect of the embodiments of this disclosure, there is provided a computer readable program code, which, when executed in a base station, will cause a computer unit to carry out the random access method as described above in the base station.

According to yet another aspect of the embodiments of this disclosure, there is provided a computer storage medium, including a computer readable program code, which will cause a computer unit to carry out the random access method as described above in a base station.

Advantages of the embodiments of this disclosure exist in that by indicating a TTI type of a UE by the first message transmitting the preamble, a base station is able to differentiate the TTI type of the UE by which the preamble is transmitted, and the UE is able to differentiate a received RAR, and an ambiguity or an error will not be resulted in receiving the RAR, thereby greatly lowering latency of the random access procedure of the shorter TTI UE.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
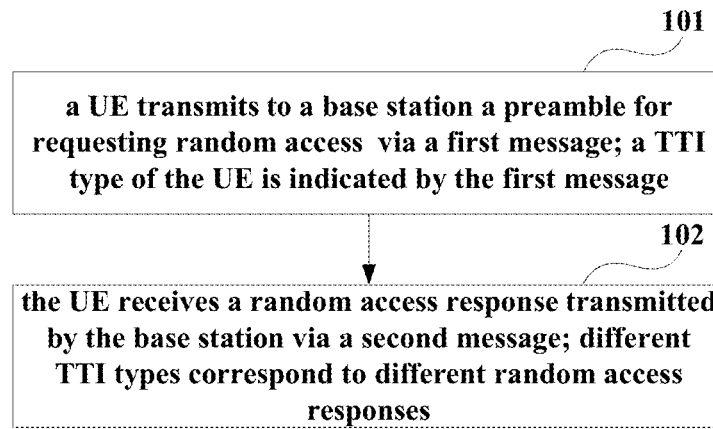
FIG. 1 is a flowchart of the random access method for supporting multiple TTIs of Embodiment 1 of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

An LTE random access procedure (which shall be described by taking contention-based random access as an example) mainly includes four steps: transmitting a preamble by a UE via a message 1, and initiating a random access procedure to a base station (such as an eNB); transmitting an RAR by the base station via a message 2, and providing timing synchronization and uplink grant (UL grant) for the UE; providing identification (ID) to the base station by the UE via a message 3 for performing contention resolution with other UE; and notifying a successfully accessed UE by the base station via a message 4.

During the random access procedure, the RAR is transmitted starting from three TTIs after message 1, and message 3 is transmitted starting from six TTIs after the RAR is received. Considering from a viewpoint of latency, if the shorter TTI UE adopts a shortened TTI for transmission in the above four messages in the random access procedure, latency of the random access procedure will be outstandingly lowered.

Taking an out-of-synchronization UE in a connected state as an example, uplink latency and downlink latency in a legacy random access procedure are 13.5 ms and 10.5 ms, respectively. If a TTI of 0.5 ms is used for transmission in the random access procedure, latency of the procedure may be reduced by a half of the original latency, i.e., 6.5 ms and 5 ms. Lowering latency is significant to the out-of-synchronization UE in performing uplink and downlink data transmission. Therefore, it is needed that UEs supporting multiple TTIs access to the network at the same time in the random access procedure, and mutual compatibility is ensured.

It is assumed that all UEs in a cell have learnt a TTI type supported by a base station via system information broadcasted by the cell, and the shorter TTI UE has selected to operate in a shorter TTI mode. At this moment, an initiated random access procedure may be from the legacy UE, or may be from the shorter TTI UE (and it be possible that there exists multiple shorter TTI UEs, such as UEs having TTIs of 0.5 ms, and 0.14 ms, etc.).

However, according to behaviors of UE provided in existing protocols, random access channel resources used by the UE in transmitting the preamble in message 1 and available preambles are all configured by the base station for all the UEs. At positions of the configured resources, the base station detects preamble that may possibly occur, and makes different RARs according to time-frequency resource positions and sequence features of the detected preambles. However, currently, such resources and sequences are defined for the legacy UE, and the base station is unable to differentiate which TTI type of UE transmits the detected preamble.

Furthermore, after transmitting message 1, the UE will receive RARs that may possibly reach within a receiving window. However, if random access time-frequency resource positions and preambles selected by the legacy UE and the shorter TTI UE are just identical, scrambling sequences of the RARs, i.e., random access radio network temporary identifiers (RA-RNTIs), and their flag RAPID fields, are completely identical. And if a UE is unable to differentiate whether a received RAR is transmitted to the legacy UE or the shorter TTI UE, it may possibly result in an ambiguity or an error in receiving the RAR.

Hence, it is needed that an independent method is designed for a random access procedure to support multiple TTI types of UEs, mainly including a method for differentiating a TTI type of UE via a preamble and a method for differentiating RARs transmitted to different TTI types of UEs.

In this disclosure, on the one hand, in order to adopt a corresponding shorter TTI mode for transmission for the shorter TTI UE when a base station transmits an RAR, a type of UE initiating random access may be notified to the base station as early as possible. That is, TTI type information of the UE is carried in message 1, so that the base station may differentiate a type of UE by which the preamble is transmitted. And on the other hand, the base station may transmit different types of RAR messages to different types of UEs, and ensure that corresponding UE correctly receives a corresponding RAR.

This disclosure shall be described below by taking contention-based random access as an example. However, this disclosure is not limited thereto, for example, it may also be applicable to a non-contention-based random access procedure.

Embodiment 1

The embodiment of this disclosure provides a random access method for supporting multiple TTIs, applicable to a UE.

FIG. 1 is a flowchart of the random access method for supporting multiple TTIs of the embodiment of this disclosure, in which a case at a UE side is shown. As shown in FIG. 1, the random access method includes:

Block 101: the UE transmits to a base station a preamble for requesting random access via a first message; a TTI type of the UE is indicated by the first message; and Block 102: the UE receives a random access response transmitted by the base station via a second message; different TTI types correspond to different random access responses.

Figure 2:
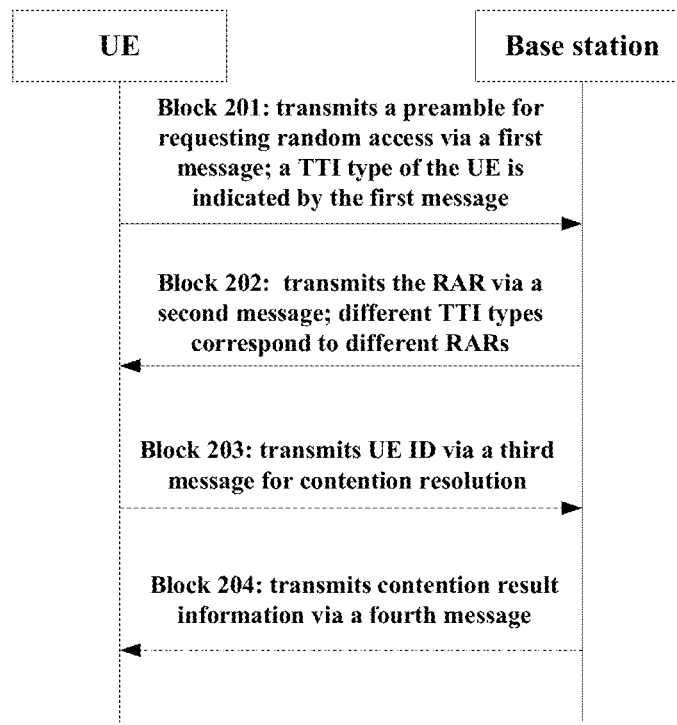
FIG. 2 is another flowchart of the random access method for supporting multiple TTIs of Embodiment 1 of this disclosure.

FIG. 2 is another flowchart of the random access method for supporting multiple TTIs of the embodiment of this disclosure, in which interchange between a UE and a base station when the contention-based random access procedure is adopted is shown. As shown in FIG. 2, the random access method includes:

Block 201: the UE transmits to the base station a preamble for requesting random access via the first message; a TTI type of the UE is indicated by the first message; and Block 202: the base station transmits the RAR to the UE via the second message; different TTI types correspond to different RARs.

As shown in FIG. 2, alternatively, the random access method may further include:

Block 203: the UE transmits UE ID to the base station via a third message for contention resolution; and Block 204: the base station transmits contention result information to the UE via a fourth message.

In this embodiment, the UE includes a first UE employing a first TTI type or a second UE employing a second TTI type; TTIs to which the first TTI type and the second TTI type correspond are different and are less than or equal to 1 ms.

For example, the first UE may be a type of one or more UEs employing the first TTI type, the second UE may be a type of one or more UEs employing the second TTI type, and the base station uniformly configures resources for a type of UE.

Following description shall be given by taking that the first UE is a UE of a TTI of 1 ms (i.e., the legacy UE) and the second UE is a UE of a TTI of less than 1 ms (such as 0.5 ms) (i.e., the shorter TTI UE) as an example; it is possible that there may exist multiple kinds of the shorter TTI UEs.

When the UE initiates random access, it will select to transmit a preamble on an available resource and take the preamble as the first message (a message 1), and the base station will detect and receive the preamble on time-frequency resources of the preamble. And TTI types of the UEs may be differentiated by resources used by the preambles, or by formats or contents of the preambles.

In one implementation (i.e., an implementation 1.1), multiple TTI types may be differentiated by the resources occupied by the preambles, the resources including one of the following or a combination thereof: a time-domain resource, a frequency-domain resource, and a sequence resource.

In particular, the UE selects available time-domain resources and available frequency-domain resources configured by the base station and selectable ZC (Zadoff-Chu) sequences (64 in total), and transmits the preamble. Hence, three methods may be used to differentiate preambles of different TTI types of UEs: allocating exclusive time-domain resources for the shorter TTI UE; allocating exclusive frequency-domain resources for the shorter TTI UE; and allocating exclusive ZC resources for the shorter TTI UE. And the three methods may be used arbitrarily, or in a combined manner.

Implementation 1.1.1

The time-domain resources for transmitting the preamble by the first UE and the time-domain resources for transmitting the preamble by the second UE are different and are orthogonal to each other.

For example, the first UE uses a first time-domain resource table, and the second UE uses a second time-domain resource table. And in the first time-domain resource table and the second time-domain resource table, identical physical random access channel (PRACH) configuration indices correspond to different subframe numbers.

In particular, the legacy UE looks up available subframe numbers, i.e., time-domain resources, in Table 5.7.1-2 in TS 36.211 protocol, according to a parameter prach-ConfigIndex configured by the base station.

TABLE 1

Table of time-domain resources used by the legacy UE (identical to Table 5.7.1-2 in TS 36.211)

| PRACH configuration indices | Formats of preambles | System frame numbers | Subframe numbers |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

In order to be differentiated from the legacy UE, the time-domain resources (i.e., subframe numbers) used by the shorter TTI UE should be orthogonal to corresponding available time-domain resources of the legacy UE under the same prach-ConfigIndex. That is, the base station configures identical prach-ConfigIndex for all the UEs, but sets of available subframe numbers indicated by the legacy UE and the shorter TTI UE are completely different (that is, there exists no intersection therebetween).

One of implementation methods may be defining a new table of time-domain resources, as shown in Table 2, which corresponds to Table 5.7.1-2 in TS 36.211 protocol in parallel. In selecting the time-domain resources for transmitting the preamble, the shorter TTI UE only looks up Table 2. Alternatively, details contents are not limited to those in Table 2 only, and any table may be used only if it satisfies being orthogonal to the lookup table of the legacy UE. Likewise, implementation manners are not limited to a method for configuring an individual table of time-domain resources, and any other methods making the shorter TTI UE select time-domain resources orthogonal to those selected by the legacy UE are within the scope of this disclosure.

TABLE 2

Table of time-domain resources used by the shorter TTI UE (newly-defined in this disclosure)

| PRACH configuration indices | Formats of preambles | System frame numbers | Subframe numbers |
| --- | --- | --- | --- |
| 0 | 0 | Even | 6 |
| 1 | 0 | Even | 9 |
| 2 | 0 | Even | 2 |
| 3 | 0 | Any | 6 |
| 4 | 0 | Any | 9 |
| 5 | 0 | Any | 2 |
| 6 | 0 | Any | 2, 7 |
| 7 | 0 | Any | 3, 8 |
| 8 | 0 | Any | 1, 6 |
| 9 | 0 | Any | 2, 5, 8 |
| 10 | 0 | Any | 3, 6, 9 |
| 11 | 0 | Any | 1, 4, 7 |
| 12 | 0 | Any | 1, 3, 5, 7, 9 |
| 13 | 0 | Any | 0, 2, 4, 6, 8 |
| 14 | 0 | Any | N/A |
| 15 | 0 | Even | 4 |
| 16 | 1 | Even | 6 |
| 17 | 1 | Even | 9 |
| 18 | 1 | Even | 2 |

TABLE 2-continued

Table of time-domain resources used by the shorter TTI UE (newly-defined in this disclosure)

| PRACH configuration indices | Formats of preambles | System frame numbers | Subframe numbers |
|---|---|---|---|
| 19 | 1 | Any | 6 |
| 20 | 1 | Any | 9 |
| 21 | 1 | Any | 2 |
| 22 | 1 | Any | 3, 8 |
| 23 | 1 | Any | 4, 9 |
| 24 | 1 | Any | 1, 6 |
| 25 | 1 | Any | N/A |
| 26 | 1 | Any | N/A |
| 27 | 1 | Any | N/A |
| 28 | 1 | Any | N/A |
| 29 | 1 | Any | N/A |
| 30 | N/A | N/A | N/A |
| 31 | 1 | Even | 4 |
| 32 | 2 | Even | 6 |
| 33 | 2 | Even | 9 |
| 34 | 2 | Even | 2 |
| 35 | 2 | Any | 6 |
| 36 | 2 | Any | 9 |
| 37 | 2 | Any | 2 |
| 38 | 2 | Any | 3, 8 |
| 39 | 2 | Any | 4, 9 |
| 40 | 2 | Any | 1, 6 |
| 41 | 2 | Any | N/A |
| 42 | 2 | Any | N/A |
| 43 | 2 | Any | N/A |
| 44 | 2 | Any | N/A |
| 45 | 2 | Any | N/A |
| 46 | N/A | N/A | N/A |
| 47 | 2 | Even | 4 |
| 48 | 3 | Even | 6 |
| 49 | 3 | Even | 9 |
| 50 | 3 | Even | 2 |
| 51 | 3 | Any | 6 |
| 52 | 3 | Any | 9 |
| 53 | 3 | Any | 2 |
| 54 | 3 | Any | N/A |
| 55 | 3 | Any | N/A |
| 56 | 3 | Any | N/A |
| 57 | 3 | Any | N/A |
| 58 | 3 | Any | N/A |
| 59 | 3 | Any | N/A |
| 60 | N/A | N/A | N/A |
| 61 | N/A | N/A | N/A |
| 62 | N/A | N/A | N/A |
| 63 | 3 | Even | 4 |

It should be noted that Table 2 only schematically shows differentiating preambles by using the time-domain resources in this disclosure. However, this disclosure is not limited thereto; for example, particular contents in Table 2 may be appropriately adjusted.

Implementation 1.1.2

The frequency-domain resources for transmitting the preamble by the first UE and the frequency-domain resources for transmitting the preamble by the second UE are different and are orthogonal to each other.

For example, the first UE selects the frequency-domain resources for transmitting the preamble by using a first parameter, and the second UE selects the frequency-domain resources for transmitting the preamble by using a second parameter.

In particular, the legacy UE selects the frequency-domain resources for transmitting the preamble according to a parameter prach-FreqOffset (the first parameter) configured by the base station. When a system bandwidth is greater than 1.4 MHz, new frequency-domain resources may be added for the shorter TTI UE, and may be orthogonal to the frequency-domain resources used by the legacy UE.

A new parameter prach-FreqOffset-shorterTTI (the second parameter) is added into the parameter PRACH-Config by the base station, which is used to indicate a frequency domain used by the shorter TTI UE, a range of which being, for example, 0-94. The legacy UE may neglect the parameter prach-FreqOffset-shorterTTI.

Implementation 1.1.3

The ZC sequence in the preamble transmitted by the first UE is different from the ZC sequence in the preamble transmitted by the second UE.

For example, a first part of the 64 ZC sequences corresponds to the first UE, and a second part of the 64 ZC sequences corresponds to the second UE.

In particular, the legacy UE selects one of the 64 ZC sequences according to the parameter configured by the base station, and takes it as a preamble for transmission. Except those sequences used for non-contention-based random access, numberOfRA-Preambles sequences are used by the legacy UE, in which sizeOfRA-PreamblesGroupA sequences belong to a group A, and others belong to group B.

If the legacy UE and the shorter TTI UE simultaneously exist in a cell, the base station adds a new parameter to characterize ZC sequences that may be used by the shorter TTI UE, and these sequences should belong to a part other than the sequences that may be used by the legacy UE.

For example, a parameter numberOfRA-Preambles-TTI-type1 is defined for a first type of shorter TTI UE, and furthermore, a parameter sizeOfRAPreamblesGroupA-TTI-type1 is defined; a parameter numberOfRA-Preambles-TTI-type2 is defined for a second type of shorter TTI UE, and furthermore, a parameter sizeOfRA-PreamblesGroupA-TTItype2 is defined. Likewise, multiple groups of parameters may be defined by more types of shorter TTI UE, so as to specify a range of ZC sequences used by it.

Hence, the ZC sequences used by the legacy UE and the ZC sequences used by different TTI types of UEs are not superimposed. For example, the very beginning numberOfRA-Preambles sequences of the 64 sequences are used by the legacy UE, subsequent numberOfRA-Preambles-TTI-type1 sequences are used by the first type of shorter TTI UE, and numberOfRA-Preambles-TTItype2 sequences thereafter are used by the second type of shorter TTI UE. A former part of the ZC sequences used by each TTI type of UE are defined as belonging to the group A, with its size being defined by the parameters sizeOfRA-PreamblesGroupA-TTItype1, and sizeOfRA-PreamblesGroupA-TTItype2, etc., and a latter part of the sequences used by this type of UE belong to the group B.

In another implementation (i.e., an implementation 1.2), multiple TTI types may be differentiated by the formats or contents of the preambles.

In particular, the legacy UE looks up formats of the preambles that should be used in Table 5.7.1-2 in TS 36.211 protocol according to prach-ConfigIndex configured by the base station, including a format 0, a format 1, a format 2, a format 3, etc. A new format of preamble may be designed as being specific for the shorter TTI UE, which is used to differentiate from the legacy UE. The new format and a legacy format of legacy preamble should have good correlation, and the legacy format and the new format should be able to be transmitted simultaneously with few mutual interference. Lengths of the preambles of the new format and of the legacy format may not be necessarily identical. A particular design of the new format of the preambles does not belong to the scope of this disclosure, and corresponding random access methods for different formats shall be defined below by taking features of three new formats as examples.

Implementation 1.2.1

A length of the preamble used by the first UE is different from that of the preamble used by the second UE.

For example the length of the preamble used by the first UE is 1 ms, or 2 ms, or 3 ms, and the length of the preamble used by the second UE is 0.5 ms; and the second UE randomly selects one from multiple available slots for transmitting the preamble.

In particular, it is assumed that there exists a new format, format 5, which is specific to the shorter TTI UE, and good correlation between it and a legacy format, format 0, or format 1, or format 2, or format 3, is ensured and there exists few interference therebetween. A time length occupied by format 5 is 0.5 ms, in which a cyclic prefix (CP), a guard time (GT), and a length of a ZC sequence, are not defined.

Figure 3:
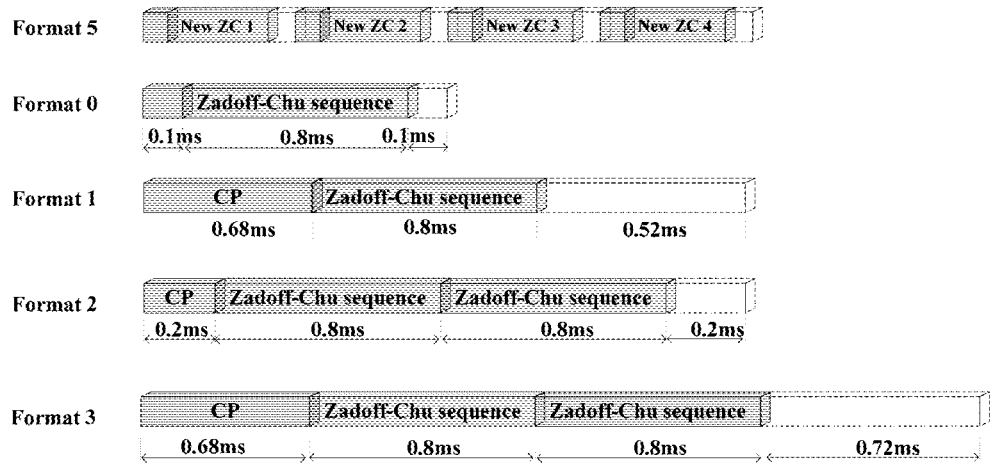
FIG. 3 is a schematic diagram of a preamble of a length different from a legacy length of Embodiment 1 of this disclosure.

FIG. 3 is a schematic diagram of the preamble of a length different from a legacy length of the embodiment of this disclosure. As shown in FIG. 3, the time length occupied by format 5 is 0.5 ms. It should be noted that FIG. 3 only schematically shows the new format different from the existing format of a preamble. However, this disclosure is not limited thereto; for example, formats of other lengths may be used.

For the shorter TTI UE, it transmits preambles by using format 5, no matter which format is configured by the base station (such as format 1, or format 2, or format 3). According to the configuration of the base station, the shorter TTI UE selects starting subframe. According to cases of the number of subframes that should be occupied by preambles (i.e., obtained time-domain resources) configured by the base station, in multiple available slot resources, a slot of 0.5 ms is randomly selected for transmitting a preamble.

case 1: if format 0 (of a length of 1 ms, i.e., two slots) is configured by the base station, the UE randomly selects one from two slots after the starting subframe for transmission;

case 2: if formats 1 and 2 (of a length of 2 ms, i.e., four slots) are configured by the base station, the UE randomly selects one from four slots after the starting subframe for transmission; and case 3: if format 3 (of a length of 3 ms, i.e., six slots) is configured by the base station, the UE randomly selects one from six slots after the starting subframe for transmission.

In this implementation, the resources used by the UE in transmitting the preamble are configured by the base station. And the UE records which slot is selected for transmission, marked by s_id ($0 \leq s\_id \leq 6$), that is, s_id denotes a position of a slot of the shorter TTI UE in transmitting the preamble in selectable time-domain resources. And the value s_id shall be used in calculating an RA-RNTI described later.

Implementation 1.2.2

The preamble used by the first UE and the preamble used by the second UE are identical with respect to length, but are different with respect to format.

For example, it is assumed that there exist some new formats, format 0a (of a length of 1 ms and corresponding to format 0), format 1a (of a length of 2 ms and corresponding to format 1), format 2a (of a length of 2 ms and corresponding to format 2), format 3a (of a length of 3 ms and corresponding to format 3), which are specific to the shorter TTI UE, and good correlation between them and the legacy formats, format 0, format 1, format 2, format 3, is ensured and there exists few interference therebetween. Time lengths occupied by the new formats are identical to those occupied by corresponding legacy formats, in which a CP, a GT, and a length of a ZC sequence, are not defined.

Figure 4:
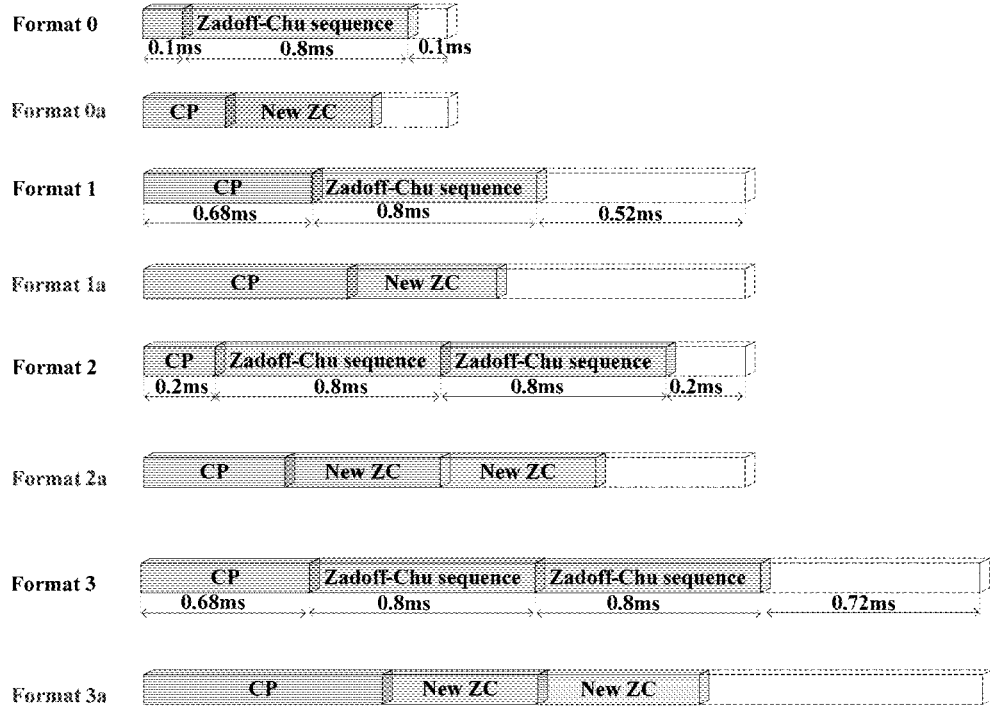
FIG. 4 is a schematic diagram of a preamble of a length identical to a legacy length of Embodiment 1 of this disclosure.

FIG. 4 is a schematic diagram of the preamble of a length identical to a legacy length of the embodiment of this disclosure. As shown in FIG. 4, the time lengths occupied by format 0a, format 1a, format 2a and format 3a are identical to those occupied by format 0, format 1, format 2 and format 3, respectively, but contents thereof (such as the CPs, the GTs, and the lengths of ZC sequences) are different.

For the shorter TTI UE, a new format is selected according to the format of the preamble specified in the parameter prach-ConfigIndex configured by the base station. That is, if the legacy UE selects format 0, the shorter TTI UE selects format 0a, if the legacy UE selects format 1, the shorter TTI UE selects format 1a, and so on. And the resources used by the UE in transmitting the preamble are configured by the base station. At this moment, the UE records s_id=1, which is used in calculating the RA-RNTI described later.

Implementation 1.2.3

The ZC sequence in the preamble used by the first UE is different from the ZC sequence in the preamble used by the second UE; for example 64 first ZC sequences are corresponding to the first UE, and different 64 second ZC sequences are generated for the second UE.

In particular, a root sequence is used first to generate 64 sequences for the legacy UE according to a parameter rootSequenceIndex configured by a radio resource control (RRC) message; and if the number does not reach 64, a next root sequence is used to generate more sequences according to an order of root sequences in Table 5.7.2-4 in TS 36.211, until the number reaches 64, preamble indices of which being 0-63.

In this implementation, after the 64 ZC sequences generated for the legacy UE (the first ZC sequences), another 64 ZC sequences (the second ZC sequences) are generated by another root sequence, which are specific for the shorter TTI UE, preamble indices of which being also 0-63, and being repeatedly numbered with those of the legacy UE, that is, one index in 0-63 indices corresponds to a legacy sequence (a first ZC sequence) and a new sequence (a second ZC sequence). The generated 128 ZC sequences are known to the base station and the UE. And correlation between the 128 ZC sequences is good.

The shorter TTI UE selects a corresponding format of a preamble according to the configuration of the base station, and uses a format identical to that of the legacy UE, but uses 64 sequences specific for the shorter TTI UE in transmitting the sequences. And the resources used by the UE in transmitting the preamble are configured by the base station. At this moment, the UE records s_id=1, which is used in calculating the RA-RNTI described later.

In this embodiment, the ZC sequences may further be grouped for the shorter TTI UE, which is applicable to all the implementations except implementation 1.1.3. When the legacy UE and the shorter TTI UE are differentiated by the two manners of time-frequency resources and the formats of the preambles (not depending on the grouping of the ZC sequences), the shorter TTI UE may occupy 64 ZC sequences. The grouping for the shorter TTI UE has no effect on grouping for the legacy UE, and they are independent of each other.

The 64 ZC sequences occupied by the shorter TTI UE are used by different shorter TTI UEs. It is here assumed that non-contention-base sequences are shared by the legacy UE and the shorter TTI UE. And by the grouping, group A sequences and group B sequences of respective types are divided for different TTI types (such as 0.5 ms, and 0.1 ms, etc.) of UE.

For example, parameters numberOfRA-Preambles-TTI-type1 and sizeOfRA-PreamblesGroupA-TTItype1 are defined for shorter TTI UE of type 1, parameters numberOfRA-Preambles-TTItype2 and sizeOfRA-PreamblesGroupA-TTItype2 are defined for shorter TTI UE of type 2, thereby defining parameters for shorter TTI UE of a specific type, so as to define a range of sequences that may be used by the UE of the type. For example, numberOfRA-Preambles-TTItypei denotes the number of ZC sequences that may be used by i-th shorter TTI UE, and sizeOfRA-PreamblesGroupA-TTItypei denotes the number of sequences in the available sequences of the i-th shorter TTI UE belonging to its group A, other sequences belonging to group B.

Figure 5:
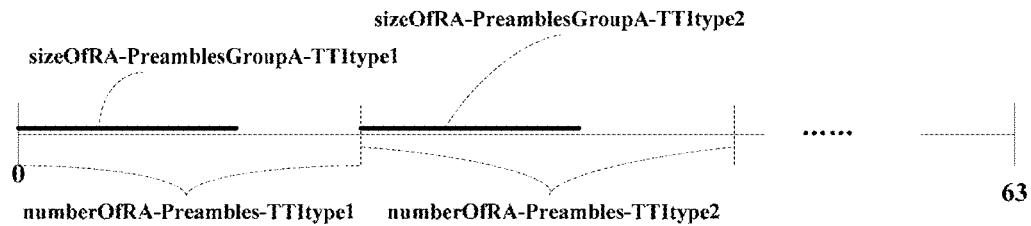
FIG. 5 is a schematic diagram of grouping 64 sequences occupied by a shorter TTI UE of Embodiment 1 of this disclosure.

FIG. 5 is a schematic diagram of grouping 64 sequences occupied by the shorter TTI UE of the embodiment of this disclosure. As shown in FIG. 5, a first type of shorter TTI UE may use sequences numbered from 0 to numberOfRA-Preambles-TTItype1-1; in which, former sizeOfRA-PreamblesGroupA-TTItype1 sequences belong to group A, and other sequences belong to group B; a second type of shorter TTI UE may use sequences numbered from numberOfRA-Preambles-TTItype1 to numberOfRA-Preambles-TTItype1 numberOfRA-Preambles-TTItype2-1; in which, former sizeOfRA-PreamblesGroupA-TTItype2 sequences belong to group A, and other sequences belong to group B; and so on.

In this embodiment, in a case where the transmission of the first message indicating the TTI type fails, the UE may further transmit a first message not indicating the TTI type.

For example, when the shorter TTI UE transmits the preamble according to the above method to notify its TTI type to the base station, if multiple attempts fail, the shorter TTI UE should transmit the preamble according to the method of transmission of the legacy UE. And information on TTI types may be transferred in subsequent signaling (for example, the information on TTI types may be carried by the message 3), during which, a legacy TTI may be used for transmission.

Block 101 or block 201 is schematically described above, and block 102 or block 202 shall be described below.

In this embodiment, at the end of three TTIs after transmitting the preamble, the UE starts to monitor a physical downlink control channel (PDCCH) scrambled by an RA-RNTI.

For example, the UE monitors the PDCCH scrambled by the RA-RNTI within "an RAR timing window" after transmitting the preamble, so as to receive an RAR corresponding to an RA-RNTI of itself. If the RAR made by the base station is not received within this RAR timing window, the random access procedure fails.

For the legacy UE, the RAR timing window starts from three subframes after a subframe transmitting the preamble. And for the shorter TTI UE, the RAR timing window starts from three TTIs after transmitting the preamble (for example, for a TTI of 0.5 ms, the RAR may be received after 1.5 ms), and ra-ResponseWindowSize TTI lengths are maintained.

In implementation 1.1, both the first UE and the second UE correspond to a first RA-RNTI (i.e., a legacy RA-RNTI). In implementation 1.2, the first UE corresponds to the first RA-RNTI, the first RA-RNTI being determined by the time-domain resource and the frequency-domain resource transmitting the preamble, and the second UE corresponds to a second RA-RNTI different from the first RA-RNTI.

For example, the legacy UE calculates an RA-RNTI by using RA-RNTI=1+t_id+10*f_id; where, t_id is a first subframe number of a random access channel resource selected by the UE in transmitting the preamble (0≤t_id<10), and f_id is frequency domain information of the random access channel selected by the UE in transmitting the preamble (0≤f_id<6). The RA-RNTI is used to differentiate RARs to which the UE transmitting preamble by using different time-frequency resources corresponds.

In this embodiment, when the legacy UE and the shorter TTI UE use identical preamble resources and may possibly use identical ZC sequences or identical ZC sequence indices (for implementation 1.2.3, an index denotes at most 64 ZC sequences, while there are 128 ZC sequences), RARs to which the legacy UE and the shorter TTI UE correspond may be differentiated by the RA-RNTI.

Hence, a new method for calculating an RA-RNTI is defined for the shorter TTI UE in the embodiment of this disclosure. The RA-RNTI to which the shorter TTI UE corresponds not only is related to the time-domain resources and frequency-domain resources transmitting the preamble, but also may be related to positions of slots transmitting the preamble.

In this embodiment, a value of the second RA-RNTI may be a value of the first RA-RNTI plus a positive integral multiple of 60.

For example, the shorter TTI UE calculates an RA-RNTI by using RA-RNTI=1+t_id+10*f_id+60*s_id; where, a default value of s_id is 1, as described above, s_id denotes positions of slots of the shorter TTI UE in transmitting the preamble in the available time-domain resources. And it may be deemed that the calculation formula of the legacy RA-RNTI is a special case of s_id=0.

It should be noted that the methods for calculating an RA-RNTI are schematically described above; however, this disclosure is no limited thereto. The above calculation formulae may be appropriately adjusted according to an actual situation. And a range of values of the new RA-RNTI and a range of values of the legacy RA-RNTI may be made different, only if there exists completely no intersection therebetween.

In this embodiment, the base station may learn the TTI type of the UE transmitting the preambles via message 1, or the base station may learn the TTI type of the UE in other manners, such as a core network, etc., and the base station should transmit corresponding RARs for different types of UEs. For example, for an RAR of the first UE, the base station scrambles the PDCCH by using the first RA-RNTI; and for an RAR of the second UE, the base station scrambles the PDCCH by using the second RA-RNTI. And each UE may descramble the PDCCH according to the RA-RNTI of itself. However, this disclosure is not limited thereto, and the base station may possibly scramble each UE by using the first RA-RNTI, and Embodiment 2 may be referred to for details.

Furthermore, the base station may possibly not learn the TTI type of the UE transmitting the preamble, in which case the base station may transmit multiple RARs corresponding to the multiple TTI types for one received preamble, such as transmitting two RARs (for the legacy UE and the UE of a TTI of 0.5 ms) for each detected preamble.

The UE may obtain the RARs in the following manners: using the first RA-RNTI by the first UE to descramble the PDCCH, and using the second RA-RNTI by the second UE to descramble the PDCCH; and decoding a physical downlink shared channel (PDSCH) according to PDCCH indication.

For example, the base station may transmit two RARs for one received preamble, and the UE may correctly receive an RAR corresponding to itself in the following two manners:

manner 1: using a legacy RA-RNTI calculation method by the legacy UE, and using the RA-RNTI calculation method newly-defined in this disclosure by the shorter TTI UE; respectively scrambling the RARs by the base station by using different RA-RNTIs; and the RAR of the legacy UE and the RAR of the shorter TTI UE being differentiated by the UE by using the RA-RNTIs to descramble the PDCCHs; and manner 2: receiving all RARs within the RAR timing window by the UE, and decrypting the PDCCHs according to the TTI type of itself; and data being wrong if an RAR is not transmitted to a TTI type of itself, and the RAR being discarded, otherwise, deeming that the RAR corresponds to the TTI type of itself.

In blocks 103 and 104, following operations may further be performed:

transmitting the third message by the UE to the base station at the end of six TTIs after the UE receives the RARs; for example, the legacy UE will transmit a message 3 (Msg3) at a 6th subframe after receiving the RAR, and the shorter TTI UE should transmit Msg3 after six TTIs after receiving the RAR.

Once Msg3 is transmitted, the UE should start a contention resolution timer mac-ContentionResolutionTimer, a numeral value of which being configured by the base station. For the legacy UE, a unit of the numeral value of the timer is subframe, and for the shorter TTI UE, a unit of the numeral value of the timer is TTI (0.5 ms or shorter).

Subsequent operations of the random access procedure are similar to those of a legacy random access procedure, which shall not be described herein any further.

It can be seen from the above embodiment that by indicating a TTI type of the UE by the first message transmitting the preamble, the base station is able to differentiate a TTI type of UE by which the preamble is transmitted, and the UE is able to differentiate a received RAR, and an ambiguity or an error will not be resulted in receiving the RAR, thereby greatly lowering latency of the random access procedure of the shorter TTI UE.

Embodiment 2

The embodiment of this disclosure provides a random access method for supporting multiple TTIs, applicable to a base station, with contents identical to those in Embodiment 1 being not going to be described herein any further.

Figure 6:
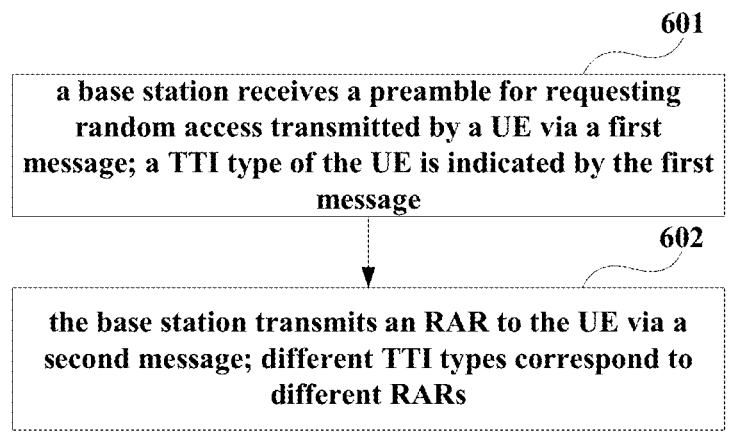
FIG. 6 is a flowchart of the random access method for supporting multiple TTIs of Embodiment 2 of this disclosure.

FIG. 6 is a flowchart of the random access method for supporting multiple TTIs of the embodiment of this disclosure, in which a case at a base station side is shown. As shown in FIG. 6, the random access method includes:

Block 601: the base station receives a preamble for requesting random access transmitted by a UE via a first message; a TTI type of the UE is indicated by the first message; and Block 602: the base station transmits an RAR to the UE via a second message; different TTI types correspond to different RARs.

In this embodiment, a random access procedure may be contention-based, and the random access method may further include: receiving by the base station, UE ID transmitted by the UE via a third message; and transmitting contention result information to the UE by the base station via a fourth message. However, this disclosure is not limited thereto, and it is also applicable to other types of random access procedures.

In this embodiment, at positions of configured time-frequency resources, the base station detects a preamble that may possibly exist, and makes responses, i.e., RARs, to a detected preamble. For example, at the end of three TTIs after the base station receives the preamble, the base station transmits the RAR to the UE via a PDCCH scrambled by an RA-RNTI.

In this embodiment, the UE may include a first UE using a first TTI type or a second UE using a second TTI type; and TTIs to which the first TTI type and the second TTI type correspond are different and less than or equal to 1 millisecond.

In the case of the above implementation 1.1, both the first UE and the second UE may correspond to a legacy RA-RNTI (i.e., a first RA-RNTI). In the case of the above implementation 1.2, the first UE may correspond to the first RA-RNTI, the first RA-RNTI being determined by time domain resources and frequency domain resources transmitting the preamble, and the second UE may correspond to a second RA-RNTI different from the first RA-RNTI. And Embodiment 1 may be referred to for particular implementations of the above contents.

Related operations of the base station in two cases shall be discussed below.

Implementation 2.1

If the base station may learn the TTI type of the UE transmitting the preamble via message 1, or the base station may learn the TTI type of the UE in other manners, such as a core network, etc., the base station should transmit corresponding RARs for different types of UEs.

For the case in implementation 1.1, the base station knows the configured time-frequency resources and grouping of the ZC sequences, the base station may determine a type of UE to which the preamble corresponds according to detected positions of the time-frequency resources and the ZC sequences, and transmit different RARs. At this moment, the legacy RA-RNTI (i.e., the first RA-RNTI) calculation method is adopted.

For the case in implementation 1.2

For implementation 1.2.1, the base station first detects legacy formats of preambles, and then detects format 5, so as to respectively detect possible preambles from the legacy UE and the shorter TTI UE, and transmit different RARs. And at this moment, the RA-RNTI (i.e., the second RA-RNTI) calculation method newly-defined in this disclosure is adopted.

For the cases in implementations 1.2.2 and 1.2.3, the base station may simultaneously detect possible preambles from the legacy UE and the shorter TTI UE by using the legacy formats of preambles, and transmit different RARs. And at this moment, the RA-RNTI (i.e., the second RA-RNTI) calculation method newly-defined in this disclosure is adopted.

After detecting the preambles, the base station will transmit RARs to detected UE after three TTIs (which is 3 ms for the legacy UE and is shorter for the shorter TTI UE).

In this embodiment, random access preamble identifier (RAPID) fields in the RARs denote indices of the ZC sequences, which are from 0 to 63, and the new 64 ZC sequences and the legacy 64 ZC sequences share the 64 indices. Uplink grant (UL grant) fields are positions of resources scheduled for the UE, UL grants in the RARs transmitted to the shorter TTI UE being scheduled according to shortened TTIs. And backoff indicator (BI) fields indicate backoff times of the UE, configured with smaller values for the shorter TTI UE.

Implementation 2.2

If the base station is unable to learn the TTI type of the UE transmitting the preamble via message 1, the base station may transmit two RARs (respectively for the legacy UE and the shorter TTI UE) for each detected preamble. However, this disclosure is not limited thereto; for example, the base station may transmit more RARs.

The base station may make a part (or all) of the time-frequency resources and ZC sequence resources shared by the legacy UE and the shorter TTI UE. After the base station detects preambles on this type of resources, the base station may deem that it is possible that the legacy UE and the shorter TTI UE transmit preambles at the same time. And the base station will allocate UL grants at the same time for the legacy UE and the shorter TTI UE, one of the resources being possibly wasted.

For example, the base station transmits two RARs for a received preamble, and the UE may correctly receive an RAR corresponding to itself in two manners:

manner 1: using a legacy RA-RNTI (the first RA-RNTI) calculation method by the legacy UE, and using the RA-RNTI (the second RA-RNTI) calculation method newly-defined in this disclosure by the shorter TTI UE; respectively scrambling the RARs by the base station by using different RA-RNTIs; and the RAR of the legacy UE and the RAR of the shorter TTI UE being differentiated by the UE by using the RA-RNTIs to descramble the PDCCHs; and manner 2: receiving all RARs within the RAR timing window by the UE, and decrypting the PDCCHs according to the TTI type of itself; and data being wrong if an RAR is not transmitted to a TTI type of itself, and the RAR being discarded, otherwise, deeming that the RAR corresponds to the TTI type of itself.

It can be seen from the above embodiment that by indicating a TTI type of the UE by the first message transmitting the preamble, the base station is able to differentiate a TTI type of UE by which the preamble is transmitted, and the UE is able to differentiate a received RAR, and an ambiguity or an error will not be resulted in receiving the RAR, thereby greatly lowering latency of the random access procedure of the shorter TTI UE.

Embodiment 3

The embodiment of this disclosure provides a random access apparatus for supporting multiple TTIs, configured in a UE. This embodiment corresponds to the random access method of Embodiment 1, with identical contents being not going to be described herein any further.

Figure 7:
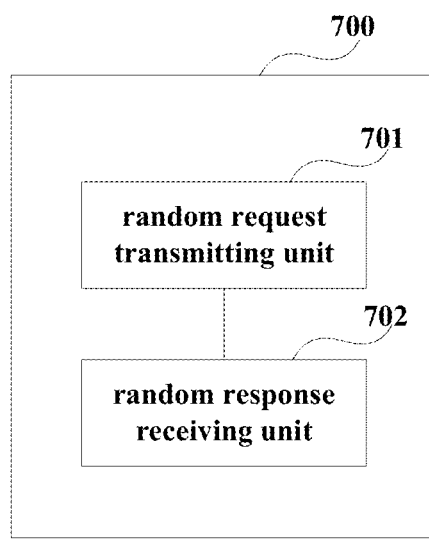
FIG. 7 is a schematic diagram of the random access apparatus for supporting multiple TTIs of Embodiment 3 of this disclosure.

FIG. 7 is a schematic diagram of the random access apparatus for supporting multiple TTIs of the embodiment of this disclosure. As shown in FIG. 7, the random access apparatus 700 includes:

a random request transmitting unit 701 configured to transmit a preamble for requesting random access to a base station via a first message; a TTI type of the UE is indicated by the first message; and a random response receiving unit 702 configured to receive a random access response transmitted by the base station via a second message; different TTI types correspond to different random access responses.

Figure 8:
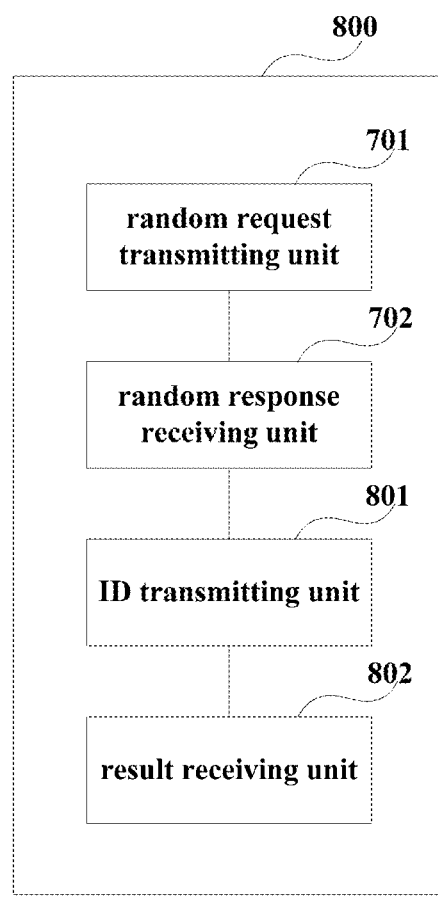
FIG. 8 is another schematic diagram of the random access apparatus for supporting multiple TTIs of Embodiment 3 of this disclosure.

FIG. 8 is another schematic diagram of the random access apparatus for supporting multiple TTIs of the embodiment of this disclosure. As shown in FIG. 8, the random access apparatus 800 includes a random request transmitting unit 701 and a random response receiving unit 702, as described above.

As shown in FIG. 8, the random access apparatus 800 may further include:

an ID transmitting unit 801 configured to transmit UE ID to the base station via a third message for contention resolution; and a result receiving unit 802 configured to receive contention result information transmitted by the base station via a fourth message.

In this embodiment, the UE includes a first UE using a first TTI type or a second UE using a second TTI type; TTIs to which the first TTI type and the second TTI type correspond are different and less than or equal to 1 millisecond.

In one implementation, multiple TTI types are differentiated by resources occupied by the preamble, the resources including any one of the following or a combination thereof: time domain resources, frequency domain resources and sequence resources.

For example, the time domain resources of the first UE for transmitting the preamble and the time domain resources of the second UE for transmitting the preamble are different and are orthogonal to each other; the first UE uses a first time domain resource table and the second UE uses a second time domain resource table, and in the first time domain resource table and the second time domain resource table, identical physical random access channel configuration indices correspond to different subframe numbers.

For another example, the frequency domain resources of the first UE for transmitting the preamble and the frequency domain resources of the second UE for transmitting the preamble are different and are orthogonal to each other; the first UE selects the frequency domain resources transmitting the preamble by using a first parameter, and the second UE selects the frequency domain resources transmitting the preamble by using a second parameter.

For a further example, a ZC sequence in the preamble transmitted by the first UE is different from a ZC sequence in the preamble transmitted by the second UE; a first part in 64 ZC sequences corresponds to the first UE, and a second part in the 64 ZC sequences corresponds to the second UE.

In another implementation, multiple TTI types are differentiated by a format or content of the preamble.

For example, a length of the preamble adopted by the first UE is different from a length of the preamble adopted by the second UE; the length of the preamble adopted by the first UE is 1 millisecond, 2 milliseconds or 3 milliseconds, the length of the preamble adopted by the second UE is 0.5 millisecond, and the second UE selects a slot from multiple available slots to transmit the preamble.

For another example, the preamble adopted by the first UE and the preamble adopted by the second UE are of the same length, but are of different formats.

For a further example, the ZC sequence in the preamble adopted by the first UE is different from the ZC sequence in the preamble adopted by the second UE; the first UE corresponds to 64 first ZC sequences, and 64 different second ZC sequences are generated for the second UE.

In this embodiment, the random request transmitting unit 701 may transmit the first message not indicating the TTI type when the transmission of the first message indicating the TTI type fails.

In this embodiment, the random response receiving unit 702 starts to monitor a physical downlink control channel scrambled by a random access radio network temporary identifier (RA-RNTI) at the end of three TTIs after the random request transmitting unit transmits the preamble;

and the ID transmitting unit 801 transmits the third message to the base station at the end of six TTIs after the random access response is received.

In this embodiment, in the case of above implementation 1.1, both the first UE and the second UE correspond to a first RA-RNTI, and both the first UE and the second UE may descramble the PDCCH by using the first RA-RNTI.

In the case of above implementation 1.2, the first UE corresponds to a first RA-RNTI, the first RA-RNTI being determined by the time domain resources and the frequency domain resources transmitting the preamble; and the second UE corresponds to a second RA-RNTI different from the first RA-RNTI. And the first UE may descramble a PDCCH by using the first RA-RNTI, and the second UE descrambles a PDCCH by using the second RA-RNTI. Furthermore, a PDSCH may be decoded according to PDCCH indication.

The embodiment of this disclosure further provides a UE, configured with the above random access apparatus 700 or 800.

Figure 9:
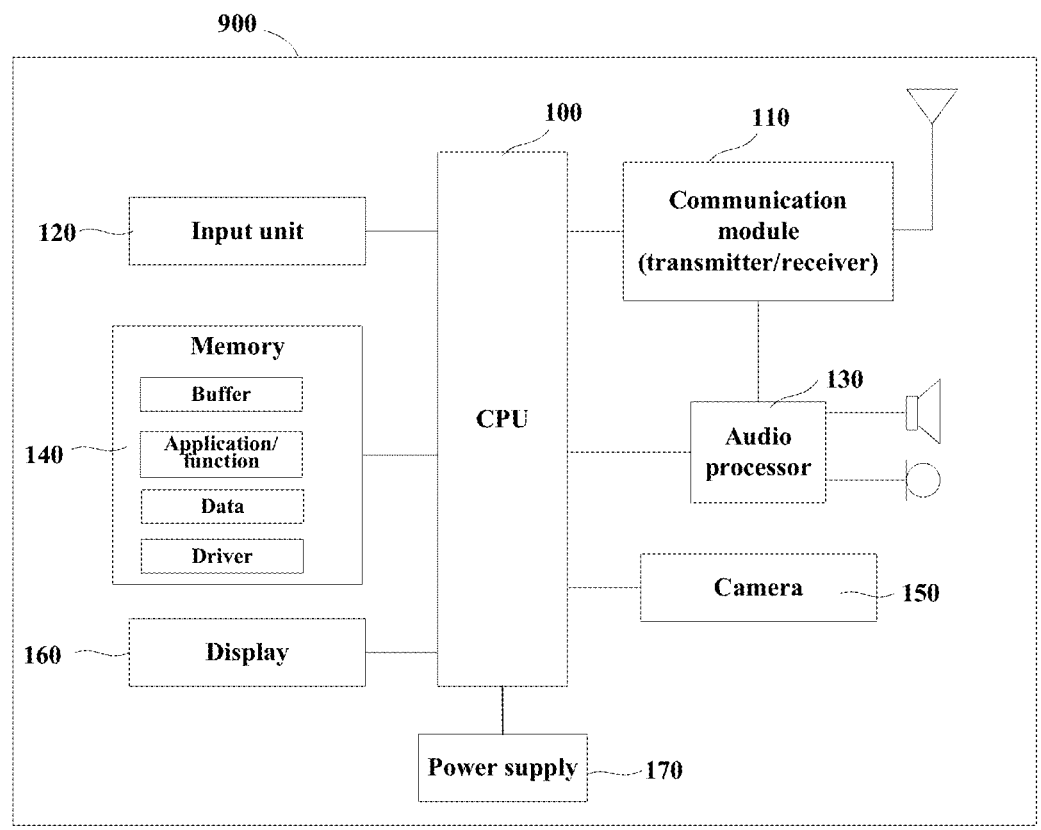
FIG. 9 is a schematic diagram of the UE of Embodiment 3 of this disclosure.

FIG. 9 is a schematic diagram of the UE of the embodiment of this disclosure. As shown in FIG. 9, the UE 900 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the random access apparatus 700 or 800 may be integrated into the central processing unit 100. The central processing unit 100 may be configured to carry out the random access method for supporting multiple TTIs described in Embodiment 1.

In another implementation, the random access apparatus 700 or 800 and the central processing unit 100 may be configured separately. For example, the random access apparatus 700 or 800 may be configured as a chip connected to the central processing unit 100, with its functions being realized under control of the central processing unit.

As shown in FIG. 9, the UE 900 may further include a communications module 110, an input unit 120, an audio processor 130, a memory 140, a camera 150, a display 160 and a power supply 170. Functions of the above components are similar to those in the relevant art, and shall not be described herein any further. It should be noted that the UE 900 does not necessarily include all the parts shown in FIG. 9, and the above components are not necessary; and furthermore, the UE 900 may include parts not shown in FIG. 9, and the relevant art may be referred to.

It can be seen from the above embodiment that by indicating a TTI type of the UE by the first message transmitting the preamble, the base station is able to differentiate a TTI type of UE by which the preamble is transmitted, and the UE is able to differentiate a received RAR, and an ambiguity or an error will not be resulted in receiving the RAR, thereby greatly lowering latency of the random access procedure of the shorter TTI UE.

Embodiment 4

The embodiment of this disclosure provides a random access apparatus for supporting multiple TTIs, configured in a base station. This embodiment corresponds to the random access method of Embodiment 2, with identical contents being not going to be described herein any further.

Figure 10:
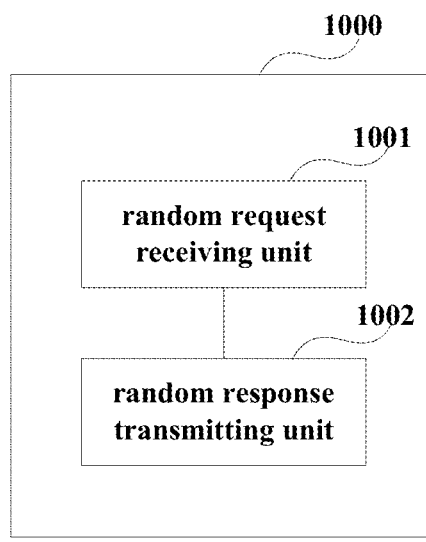
FIG. 10 is a schematic diagram of the random access apparatus for supporting multiple TTIs of Embodiment 4 of this disclosure.

FIG. 10 is a schematic diagram of the random access apparatus for supporting multiple TTIs of the embodiment of this disclosure. As shown in FIG. 10, the random access apparatus 1000 includes:

a random request receiving unit 1001 configured to receive a preamble for requesting random access transmitted by a UE via a first message; a TTI type of the UE is indicated by the first message; and a random response transmitting unit 1002 configured to transmit a random access response to the UE via a second message; different TTI types correspond to different random access responses.

Figure 11:
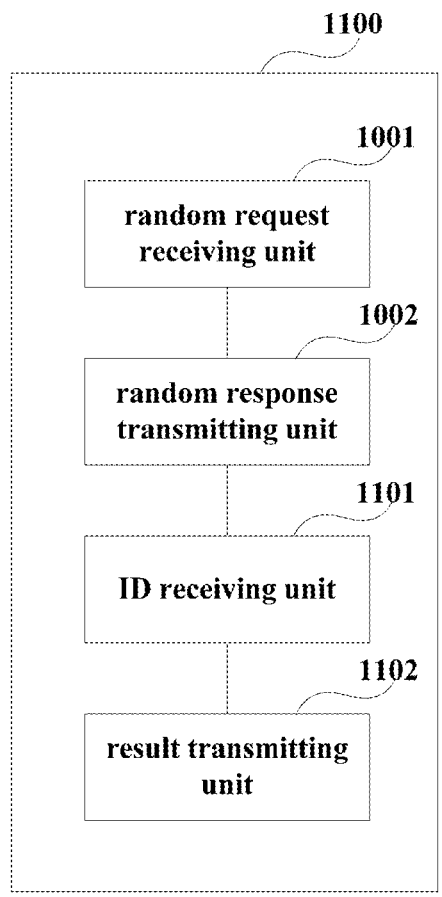
FIG. 11 is another schematic diagram of the random access apparatus for supporting multiple TTIs of Embodiment 4 of this disclosure.

FIG. 11 is another schematic diagram of the random access apparatus for supporting multiple TTIs of the embodiment of this disclosure. As shown in FIG. 11, the random access apparatus 1100 includes a random request receiving unit 1001 and a random response transmitting unit 1002, as described above.

As shown in FIG. 11, the random access apparatus 1100 may further include:

an ID receiving unit 1101 configured to receive a UE ID transmitted by the UE via a third message; and a result transmitting unit 1102 configured to transmit contention result information to the UE via a fourth message.

In this embodiment, at the end of three TTIs after the random request receiving unit 1001 receives the preamble, the random response transmitting unit 1002 transmits the random access response to the UE via a PDCCH scrambled by an RA-RNTI.

In this embodiment, the UE may include a first UE using a first TTI type or a second UE using a second TTI type; TTIs to which the first TTI type and the second TTI type correspond are different and less than or equal to 1 millisecond.

In this embodiment, in the case of the above implementation 1.1, both the first UE and the second UE may correspond to a first RA-RNTI. In the case of the above implementation 1.2, the first UE may correspond to the first RA-RNTI, the first RA-RNTI being determined by time domain resources and frequency domain resources transmitting the preamble, and the second UE may correspond to a second RA-RNTI different from the first RA-RNTI.

In this embodiment, the random response transmitting unit 1002 may further be configured to, for a received preamble, transmit multiple RARs corresponding to the multiple TTI types.

The embodiment of this disclosure further provides a base station, configured with the above random access apparatus 1000 or 1100.

Figure 12:
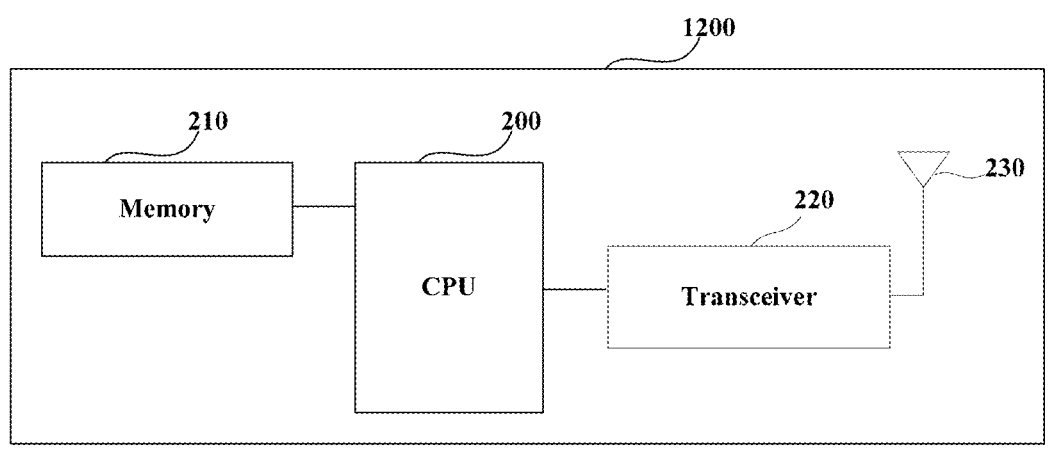
FIG. 12 is a schematic diagram of the base station of Embodiment 4 of this disclosure.

FIG. 12 is a schematic diagram of a structure of the base station of the embodiment of this disclosure. As shown in FIG. 12, the base station 1200 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The functions of the random access apparatus 1000 or 1100 may be integrated into the central processing unit 200. The central processing unit 200 may be configured to carry out the random access method supporting multiple TTIs described in Embodiment 2.

Furthermore, as shown in FIG. 12, the base station 1200 may include a transceiver 220, and an antenna 230, etc. Functions of the above components are similar to those in the relevant art, and shall not be described herein any further.

It should be noted that the base station 1200 does not necessarily include all the parts shown in FIG. 12, and furthermore, the base station 1200 may include parts not shown in FIG. 12, and the relevant art may be referred to.

It can be seen from the above embodiment that by indicating a TTI type of the UE by the first message transmitting the preamble, the base station is able to differentiate a TTI type of UE by which the preamble is transmitted, and the UE is able to differentiate a received RAR, and an ambiguity or an error will not be resulted in receiving the RAR, thereby greatly lowering latency of the random access procedure of the shorter TTI UE.

Embodiment 5

The embodiment of this disclosure provides a communications system, supporting multiple TTIs, with contents identical to those in embodiments 1-4 being not going to be described herein any further.

Figure 13:
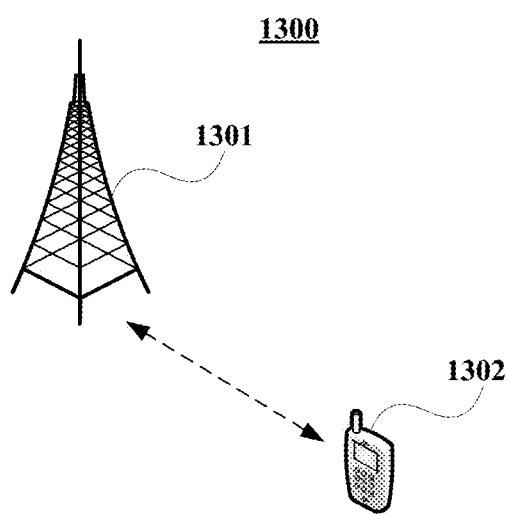
FIG. 13 is a schematic diagram of the communications system of Embodiment 5 of this disclosure.

FIG. 13 is a schematic diagram of the communications system of the embodiment of this disclosure. As shown in FIG. 13, the communications system 1300 includes a base station 1301 and UE 1302.

The UE 1302 transmits a preamble for requesting random access via a first message, a TTI type of the UE 1302 being indicated by the first message; and the base station 1301 receives, via the first message, the preamble transmitted by the UE, and transmits an RAR to the UE 1301 via the second message; different TTI types correspond to different RARs; and the UE 1302 receives an RAR transmitted via a second message.

An embodiment of the present disclosure provides a computer readable program code, which, when executed in a UE, will cause a computer unit to carry out the random access method for supporting multiple TTIs described in Embodiment 1 in the UE.

An embodiment of the present disclosure provides a computer storage medium, including a computer readable program code, which will cause a computer unit to carry out the random access method for supporting multiple TTIs described in Embodiment 1 in a UE.

An embodiment of the present disclosure provides a computer readable program code, which, when executed in a base station, will cause a computer unit to carry out the random access method for supporting multiple TTIs described in Embodiment 2 in the base station.

An embodiment of the present disclosure provides a computer storage medium, including a computer readable program code, which will cause a computer unit to carry out the random access method for supporting multiple TTIs described in Embodiment 2 in a base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communications combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A random access apparatus configured in a user equipment (UE), the random access apparatus comprising:
   a processor circuit; and
   a transceiver configured to:
      support multiple transmission time intervals (TTIs);
      transmit to a base station a preamble for requesting random access via a first message using a TTI among the multiple TTIs; and
      receive a random access response transmitted by the base station via a second message; wherein a random access parameter is calculated based on a slot position for transmitting the preamble of the first message.

2. The random access apparatus according to claim 1, wherein the transceiver is further configured to:
   transmit a UE ID to the base station via a third message to perform contention resolution; and
   receive contention result information transmitted by the base station via a fourth message.

3. The random access apparatus according to claim 1, wherein the random access apparatus configures the UE to perform random access with a first TTI type or a second TTI type;
   and wherein TTIs to which the first TTI type and the second TTI type correspond are different and less than or equal to 1 millisecond.

4. The random access apparatus according to claim 3, wherein the TTI types are differentiated by resources occupied by the preamble, the resources comprising at least one of: a time domain resource, a frequency domain resource and a sequence resource.

5. The random access apparatus according to claim 4, wherein the time domain resource of the UE transmitting the preamble corresponding to the first TTI type and the time domain resource of the UE transmitting the preamble corresponding to the second TTI type are different and are orthogonal to each other;
   and wherein the UE transmitting the preamble corresponding to the first TTI type uses a first time domain resource table and the UE transmitting the preamble corresponding to the second TTI type uses a second time domain resource table, and in the first time domain resource table and the second time domain resource table, identical physical random access channel configuration indices correspond to different subframe numbers.

6. The random access apparatus according to claim 4, wherein the frequency domain resource of the UE transmitting the preamble corresponding to the first TTI type and the frequency domain resource of the UE transmitting the preamble corresponding to the second TTI type are different and are orthogonal to each other;

and wherein the UE selects the frequency domain resource to transmit the preamble corresponding to the first TTI type by using a first parameter, and the UE selects the frequency domain resource to transmit the preamble corresponding to the second TTI type by using a second parameter.

7. The random access apparatus according to claim 4, wherein a ZC sequence in the preamble transmitted by the UE configured to perform the random access with the first TTI type is different from a ZC sequence in the preamble transmitted by the UE configured to perform the random access with the second TTI type;

and wherein a first part in 64 ZC sequences corresponds to the UE configured to perform the random access with the first TTI type, and a second part in the 64 ZC sequences corresponds to the UE configured to perform the random access with the second TTI type.

8. The random access apparatus according to claim 3, wherein a length of the preamble adopted by the UE configured to perform the random access with the first TTI type is different from a length of the preamble adopted by the UE configured to perform the random access with the second TTI;

and wherein the length of the preamble adopted by the UE configured to perform the random access with the first TTI type is 1 millisecond, 2 milliseconds or 3 milliseconds, the length of the preamble adopted by the UE configured to perform the random access with the second TTI type is 0.5 millisecond, and the UE configured to perform the random access with the second TTI type selects a slot from multiple available slots to transmit the preamble.

9. The random access apparatus according to claim 3, wherein the preamble adopted by the UE configured to perform the random access with the first TTI type and the preamble adopted by the UE configured to perform the random access with the second TTI type are of the same length but are of different formats.

10. The random access apparatus according to claim 3, wherein a ZC sequence in the preamble adopted by the UE configured to perform the random access with the first TTI type is different from a ZC sequence in the preamble adopted by the UE configured to perform the random access with the second TTI type;

and wherein the UE configured to perform the random access with the first TTI type corresponds to 64 first ZC sequences, and 64 different second ZC sequences are generated for the UE configured to perform the random access with the second TTI type.

11. The random access apparatus according to claim 2, wherein the transceiver starts to monitor a physical downlink control channel scrambled by a random access radio network temporary identifier (RA-RNTI) at the end of three TTIs after the transceiver transmits the preamble;

and the transceiver transmits the third message to the base station at the end of six TTIs after the random access response is received.

12. The random access apparatus according to claim 4, wherein both the UE configured to perform the random access with the first TTI type and the UE configured to perform the random access with the second TTI type correspond to a first RA-RNTI, the first RA-RNTI being determined by the time domain resources and the frequency domain resources transmitting the preamble;

and both the UE configured to perform the random access with the first TTI type and the UE configured to perform the random access with the second TTI type descramble a physical downlink control channel by using the first RA-RNTI.

13. The random access apparatus according to claim 3, wherein the UE configured to perform the random access with the first TTI type corresponds to a first RA-RNTI, the first RA-RNTI being determined by the time domain resources and the frequency domain resources transmitting the preamble; and the UE configured to perform the with the second TTI type corresponds to a second RA-RNTI different from the first RA-RNTI;

and the UE configured to perform the random access with the first TTI type descrambles a physical downlink control channel by using the first RA-RNTI, and the UE configured to perform the with the second TTI type descrambles a physical downlink control channel by using the second RA-RNTI.

14. The random access apparatus according to claim 13, wherein a value of the second RA-RNTI is a value of the first RA-RNTI plus a positive integral multiple of 60.

15. The random access apparatus according to claim 13, wherein the second RA-RNTI is calculated by using s_id; where s_id denotes a slot position for transmitting the preamble sequence.

16. A random access apparatus configured in a base station, the random access apparatus comprising:
    a processor circuit; and
    a transceiver configured to:
        support multiple transmission time interval (TTI) types;
        receive a preamble for requesting random access transmitted by a UE via a first message using a TTI among the multiple TTIs; and
        transmit a random access response to the UE via a second message; wherein a random access parameter is calculated based on a slot position for transmitting the preamble of the first message.

17. The random access apparatus according to claim 16, wherein the transceiver is further configured to, for a received preamble, transmit multiple random access responses corresponding to the TTI types.

18. A communications system, comprising:
    a UE configured to:
        perform a random access with multiple transmission time intervals (TTIs),
        transmit a preamble for requesting random access via a first message using a TTI among the multiple TTIs, and
        receive a random access response transmitted via a second message; and
    a base station configured to:
        perform a random access with multiple transmission time intervals (TTIs),
        receive the preamble transmitted by the UE via the first message, and transmit the random access response to the UE via the second message, wherein a random access parameter is calculated based on a slot position for transmitting the preamble of the first message.

* * * * *